United States Patent

Tarr et al.

Patent Number: 6,099,767
Date of Patent: Aug. 8, 2000

[54] INJECTION MOLDING SYSTEM WITH SEQUENTIAL GATE CONTROL

[75] Inventors: John W. Tarr, Goodrich; Dave Reitan, Clinton Township, both of Mich.

[73] Assignee: Incoe Corporation, Troy, Mich.

[21] Appl. No.: 09/174,236

[22] Filed: Oct. 16, 1998

Related U.S. Application Data

[62] Division of application No. 08/934,170, Sep. 19, 1997, Pat. No. 5,919,492.
[60] Provisional application No. 60/049,531, Jun. 13, 1997.

[51] Int. Cl.[7] .................................................. B29C 45/22
[52] U.S. Cl. .................... 264/40.1; 264/40.7; 264/297.2; 264/328.8; 425/145; 425/570; 425/572; 425/588
[58] Field of Search ................................. 264/40.1, 40.5, 264/40.7, 297.2, 328.1, 328.8; 425/144, 145, 149, 150, 570, 572, 588

[56] References Cited

U.S. PATENT DOCUMENTS

| | | | |
|---|---|---|---|
| 3,840,312 | 10/1974 | Paulson et al. | 425/149 |
| 4,279,582 | 7/1981 | Osuna-Diaz | 425/570 |
| 5,256,345 | 10/1993 | Yokota | 264/40.1 |
| 5,389,315 | 2/1995 | Yabushita . | |
| 5,556,582 | 9/1996 | Kazmer | 264/40.1 |

*Primary Examiner*—Jill L. Heitbrink

[57] ABSTRACT

An injection molding machine [10] for molding plastic parts by injecting a molten plastic through a plurality of valve gates [31] into a mold cavity by reciprocation of a helical screw [16]. A linear position sensor [34] positioned on the machine to detect the position of the helical screw [16] and control the opening and closing of the gates [31] based on the detected position of the screw [16]. A computer is in communication with the valve gates and the position sensor to monitor the position and activate the opening and closing of the valve gates [31]. A pressure transducer is associated with the mold cavity and in communication with the computer [32] as an alternate or additional method for controlling the opening and closing of the valve gates [31].

5 Claims, 9 Drawing Sheets

Fig. 10

Execute Gate Sequence

| Gate | Action | Travel | Time |
|------|--------|--------|------|
| 01 | OPEN | 6.94 | 0.35 |
| 01 | CLOSE | 6.38 | 0.76 |
| 02 | OPEN | 6.38 | 0.76 |
| 02 | CLOSE | 6.25 | 1.07 |
| 03 | OPEN | 6.25 | 1.07 |
| 03 | CLOSE | 5.92 | 1.49 |
| 04 | OPEN | 5.92 | 1.49 |
| 04 | CLOSE | 5.62 | 1.78 |
| 05 | OPEN | 5.62 | 1.78 |
| 05 | CLOSE | 5.46 | 1.94 |
| 06 | OPEN | 5.46 | 1.94 |
| 06 | CLOSE | 5.23 | 2.16 |
| 07 | OPEN | 5.23 | 2.16 |
| 01 | OPEN | 5.04 | 2.44 |
| 07 | CLOSE | 5.04 | 2.44 |
| 08 | OPEN | 5.04 | 2.44 |
| 01 | CLOSE | 4.79 | 2.60 |
| 02 | OPEN | 4.79 | 2.60 |
| 02 | CLOSE | 4.43 | 2.84 |
| 03 | OPEN | 4.43 | 2.84 |

DATE  TIME

Linear Device
Volts  Scale  Units  Home←  Max Cycle Time
10  15  in.  0625  25

Gate File Info
File 123  Mold open Option Disable
Mold Number 9135

Current Status
Home  Travel  Time
8.01  8.00

Mold Closed | Alarm | System Ready | E-Stop

Gate Status
| 01 | 02 | 03 | 04 | 05 | 06 | 07 | 08 |
| 09 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |

▨ = Open   ☐ = Closed

Scroll Up | Scroll Down | Print | Help | Edit Config | Save Alt. File | Exit

Waiting for Start Signal

Fig. 11

Verify Home Position

Linear Travel (in.)          0.00
0.0            7.5            15.0

Accept | Cancel

Fig. 12

Fig. 13

INJECTION MOLDING SYSTEM WITH SEQUENTIAL GATE CONTROL

CROSS REFERENCE TO RELATED APPLICATIONS

This application is a divisional of U.S. Ser. No. 08/934,170, filed Sep. 19, 1997 now U.S. Pat. No. 5,919,492 and claims benefit from prior filed co-pending provisional application Ser. No. 60/049,531 filed Jun. 13, 1997.

TECHNICAL FIELD

The present invention relates to a method and apparatus for injection molding. More particularly, the present invention relates to a method and apparatus for injection molding parts by sequential control of valve gate bushings to regulate the flow of a molten material into a mold cavity to form a molded part.

BACKGROUND OF THE INVENTION

Injection molding machines and certain processes for injection molding are well known in the art. According to known injection molding methods, a molten material, such as plastic, is distributed to a mold having two halves which are then closed upon one another to form a part in the shape of the cavity that is formed in the mold.

More specifically, in known injection molding methods and processes, the molten material is supplied to the mold from an injection molding machine. The material is fed into the machine via a hopper or the like. The material is then transferred to a barrel associated with the machine where it is heated. The barrel houses a reciprocating screw which reciprocates linearly therein. During the injection molding process, the reciprocating screw moves toward the mold forcing the molten material through a manifold and then through a plurality of bushings into the mold cavity or cavities. The bushings are placed in the mold, at various locations depending upon the part to be molded.

It is necessary to control the amount of molten material that is supplied to the mold cavity, as the required amount depends on the size, shape, thickness and other factors of the part or parts to be molded. The amount of molten material that is supplied through each bushing is typically controlled by opening and closing each of the valve gates based on time control. The time at which the valve gate bushings open and close and the duration that they are open and closed is predetermined by the needs of the particular part to be molded and type of material being used. These are typically predetermined through experimentation, which takes a considerable amount of time.

For conventional injection molding methods utilizing a timer control, the opening period of the valve gates can only be controlled typically on the order of 0.01 seconds. Thus, due to various uncontrolled factors, such as changes in the flow resistance due to temperature and/or material viscosity changes, the amount of molten material flowing through the valve gates during a certain period of time cannot be accurately controlled. As a result, it is known that some rejects will be produced.

One known method is disclosed in U.S. Pat. No. 5,389,315. In this system, the valve gates of the bushings are sequentially opened one after the other based on the amount of molten resin supplied from the barrel as detected by metering mechanisms associated with each of the valve gates. Additionally, the patent discloses opening and closing the valve gates without any overlap based on the position of an in-line screw.

As the valve gates are opened and closed without any overlap, the quality of the part can be affected, and the time to manufacture such a part can be increased.

Further, the type of parts that can be made with such a process can be limited.

These prior methods are basically unable to consistently monitor and control the amount of material injected into the mold cavity with sufficient accuracy to produce a high quality molded part. Further, these methods and apparatuses require prolonged set up times and result in waste of material during the molding start-up.

SUMMARY OF THE INVENTION

It is an object of the present invention to measure and control the amount of plastic or other molten material flowing through the manifold and a plurality of valve gate bushings by opening and closing the valve gates based on an indication of the position of a reciprocating screw of an injection molding machine as represented by a separate linear potentiometer attached to the machine.

It is a related object of the present invention to measure and control the amount of plastic or other molten material flowing through a manifold and a plurality of valve gate bushings by opening and closing the gates based on the cavity pressure in the mold cavity.

It is another related object of the present invention to measure and control the amount of plastic or other molten material flowing through a manifold and a plurality of valve gate bushings by opening and closing the valve gates based on time, linear movement of the screw, and/or pressure, or any combination thereof.

In accordance with the objects of the present invention, an injection molding machine comprises a material hopper for receiving material to be used in the molding process. The material is heated to a molten state in the barrel. The barrel houses a reciprocating screw which axially reciprocates therein. The initial position of the screw is detected as well as the absolute shot size required to mold the part by an externally mounted linear potentiometer. The number of bushings in the injection mold is also entered into the controller which monitors and controls their opening and closing and the operation of the valve gate system. The bushings have valve gates which are controlled by pin members to open and close the valve gates to respectively allow and restrict the flow of material into the mold cavity. The controller detects when the mold is closed before allowing the injection molding process to commence. The remainder of the mold filling and packing process is computer controlled.

The controller is also in communication with the linear potentiometer or position sensor to monitor the position of the reciprocating screw. The controller can also be placed in communication with a pressure transducer to monitor the pressure in the mold cavity.

Based on receiving the mold closed signal from the injection molding machine along with the system ready signal from the controller to the injection molding machine, the reciprocating screw, under pressure, forces molten material into the mold. The opening and closing of the valve gate pins allows the flow of molten material into the mold cavities. This is controlled by the PC based computer system based on the position of the screw as determined by the linear potentiometer, the pressure in the mold cavity as determined by the pressure transducer, and/or time.

Additional features and advantages of the present invention will become apparent to one of skill in the art upon consideration of the following detailed description of the present invention.

BRIEF DESCRIPTION OF THE DRAWINGS

FIG. 3 is an illustration of a bushing, including a valve gate and pin, in accordance with a preferred embodiment of the present invention;

FIG. 10 is a diagram illustrating the system status after completion of a molding process in accordance with the present invention;

FIG. 11 is a diagram illustrating the verify home position screen for a single reciprocating screw in accordance with the present invention;

FIG. 12 is a diagram illustrating the valve gate configuration screen for a dual reciprocating screw system in accordance with a preferred embodiment of the present invention;

FIG. 13 is a diagram illustrating the verify home position screen for the dual reciprocating screw system in accordance with a preferred embodiment of the present invention.

BEST MODE FOR CARRYING OUT THE INVENTION

Figure 1:
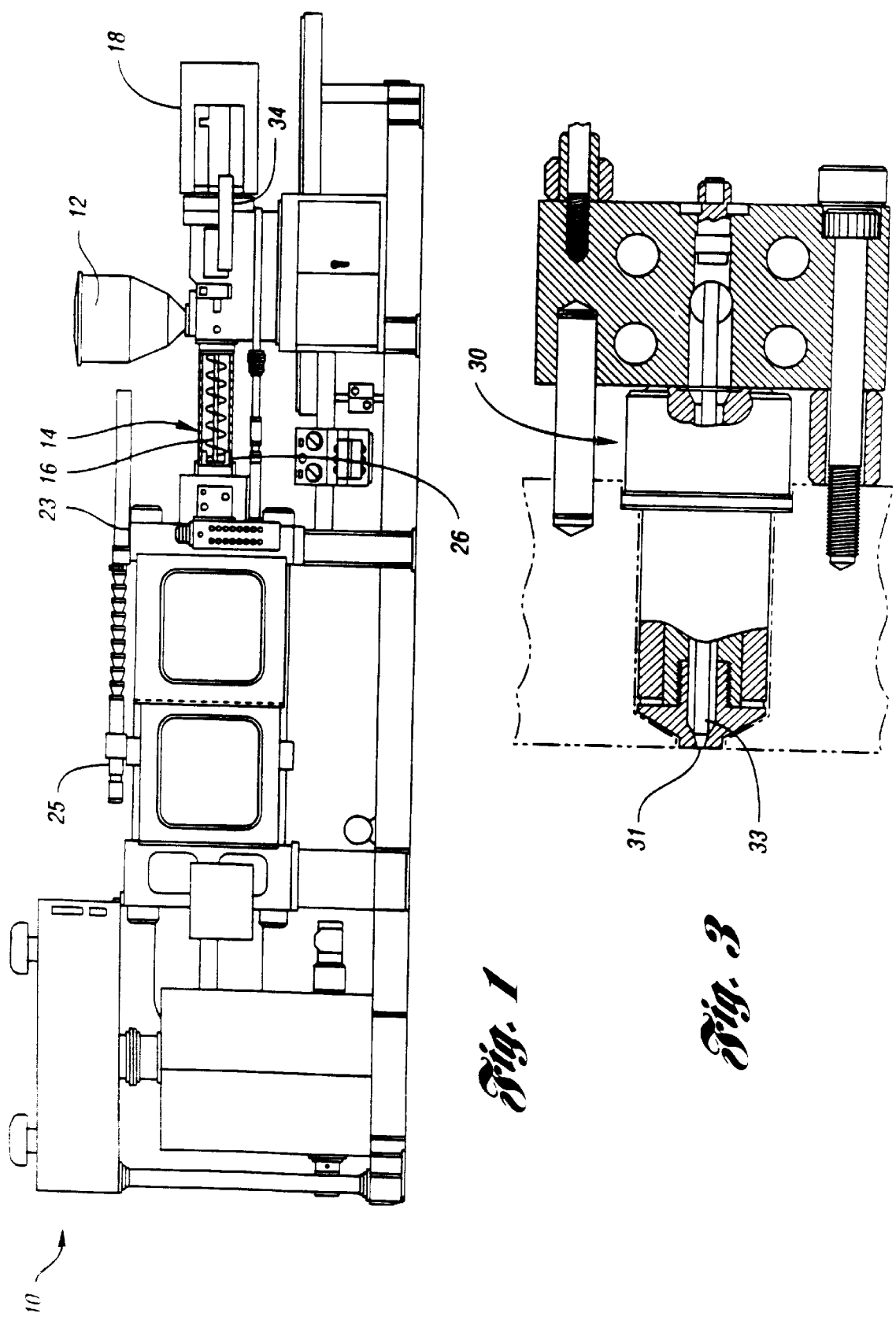
FIG. 1 is a side view illustration of an injection molding machine in accordance with a preferred embodiment of the present invention.

FIG. 1 illustrates an injection molded machine 10. The machine 10 is used in the injection molding process to service a mold which forms molded parts. The molded parts are preferably plastic.

However, it should be understood that the parts can be molded from any suitable material.

The machine 10 is part of an injection molding system and includes a material hopper 12 that receives the material to be molded in a non-molten form. Such material is preferably in the form of pellets. The pellets are fed into the hopper 12 and are transferred directly to a barrel 14 associated with the machine 10. The pellets are heated to a molten state by electric heaters or the like (not shown) on the barrel 14. The barrel 14 includes a reciprocating screw 16 reciprocating therein to inject the molten material into the mold. The reciprocating screw 16 also acts as a piston and can be pressurized to drive the molten material to the mold.

Figure 2:
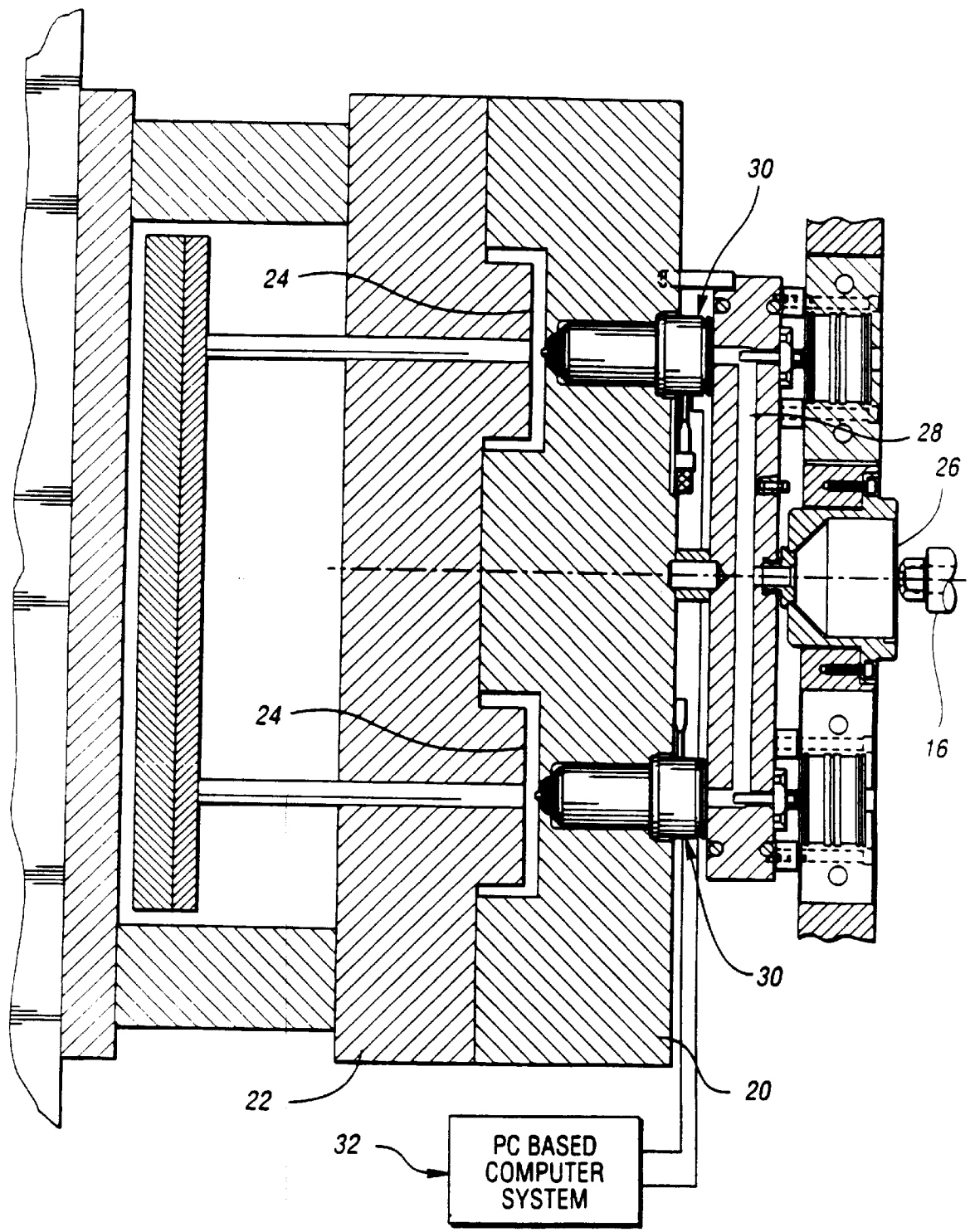
FIG. 2 is a cross-sectional view illustrating the communication between the barrel and the mold cavity in accordance with a preferred embodiment of the present invention.

The machine 10 further includes a motor 18 which drives the reciprocating screw 16. The injection molding machine 10 has a pair of machine platens 23, 25. A pair of mold halves 20, 22 (FIG. 2) are each positioned on respective platens. The first platen 23 is stationary while the second platen 25 is moveable by a motor to move the mold halves 20, 22 into contact with one another. The first mold half 20 is in communication with the barrel 14, while the second mold half 22 is moveable toward the first mold half 20 into a closed position whereby the two mold halves 20, 22 form a mold cavity 24, in the shape of the part to be molded.

The barrel 14 is in communication with the first mold half 20 and thus the mold cavity 24 at a first end 26. The molten material is forced by the movement of the reciprocating screw 16 through the first end 26 of the barrel 14 and into a manifold with a plurality of passageways 28. The passageways 28 in turn are in communication with the manifold and a plurality of valve gate bushings 30 placed in the first mold half 20. The reciprocating screw 16 acts like a piston and as it moves toward the mold, it carries molten material forward therewith.

The number of valve gate bushings 30 and their location on the surface of the first mold half 20 may vary depending upon the size and shape of the part or parts to be molded. Thus, the number of passageways 28 in the manifold will also increase proportionally. The computer 32, such as a Pentium equipped computer, allows for user interface allowing a user to input information. However, the computer 32 can be any commercially available computer. In the preferred embodiment, an I/O board, a timing board, a driving board, and an analog board are also integrated into the computer 32. These boards are all commercially available. The computer 32 also preferably includes a commercially available touch screen or flat panel display.

FIG. 3 illustrates a valve gate bushing 30 adapted to receive molten material from the barrel 14. The valve gate bushing 30 has a valve gate 31 that opens into the mold cavity allowing molten material to flow therethrough. A pin 33 is also included which moves back and forth to open and close the valve gate 31 and thus control the flow of molten material therethrough. The operation of these bushings 30 is well known in the art.

Figure 4:
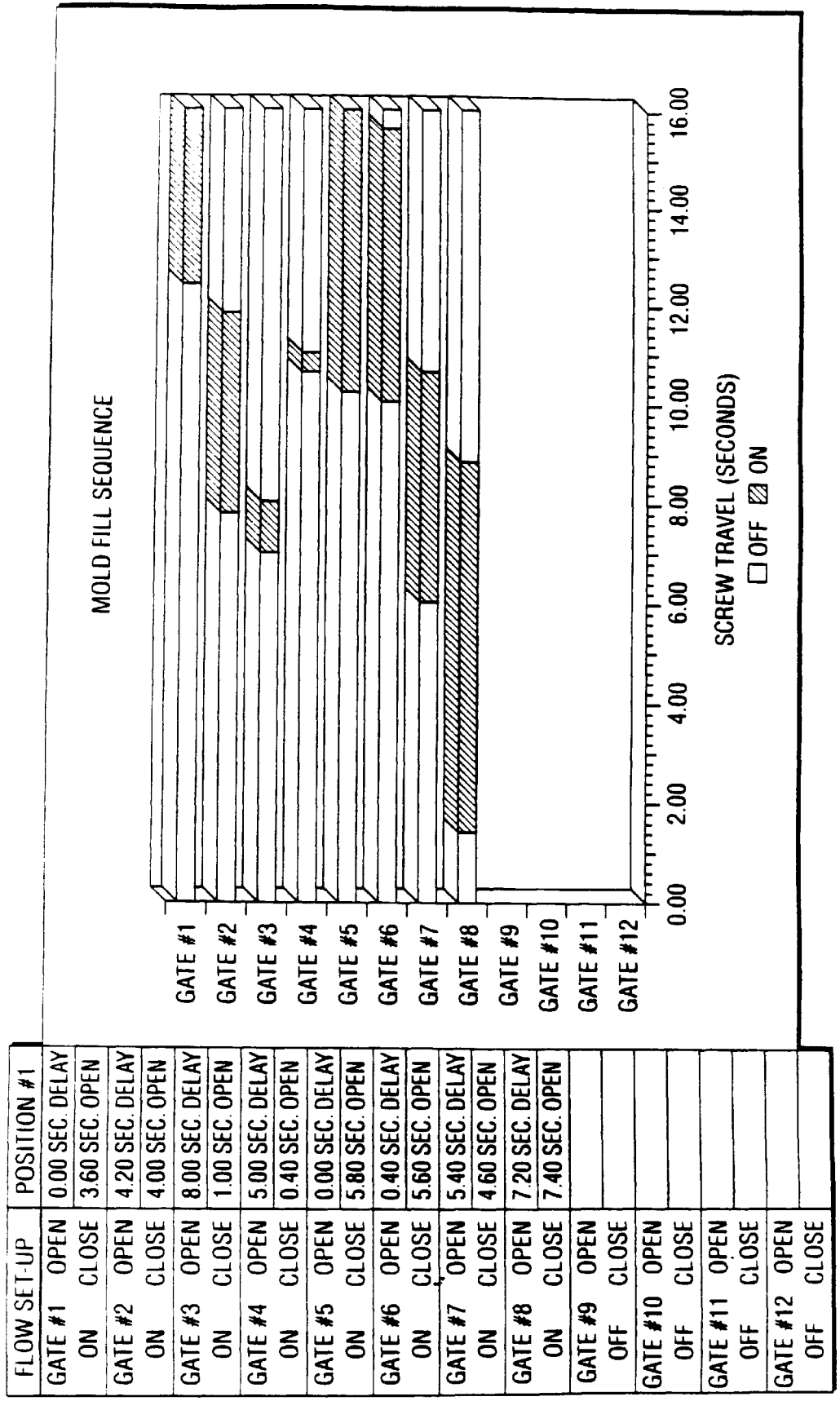
FIG. 4 is a bar chart illustrating a mold fill sequence used to control the opening and closing of a plurality of valve gates based on a timer to mold a particular part.

FIG. 4 illustrates a valve gate controller timing chart for controlling the opening and closing of a plurality of bushing valve gates 31 based on time as regulated by the computer 32. The respective valve gates 31 are illustrated on the vertical axis of the chart while the travel of the reciprocating screw 16 in time (seconds) is represented on the horizontal axis. The bar chart in FIG. 4 illustrates the mold fill sequence for a particular part. It is known in the art that the sequence in which various valve gates are opened can be varied to mold the part or parts more effectively. Also, weld lines can be eliminated or moved to a non-critical area of the part by varying the sequence in which the valve gates are opened and closed.

As shown in FIG. 4, eight bushings numbered one through eight are located on the surface of the mold half 20. However, it is obvious that any number of valve gate bushings 30 can be used. The computer 32 is programmed with the required information on the volume required for the part or parts to be molded. While the system, shown in FIG. 4, has twelve valve gates, only gates one through eight are used in this example. Thus, during set up of the computer 32 prior to initiating the process, gates one through eight are programmed to be "on" while gates nine through twelve are programmed to be "off" since only eight bushings are used in this example. The computer 32 sends a signal to the machine 10 indicating that the system is ready. Then the mold halves 20, 22 close and a signal is sent to the computer indicating that the mold is closed and the injection process is initiated. The reciprocating screw 16 under pressure moves towards the mold halves 20, 22 forcing molten plastic toward the valve gate bushings 30, which open in accordance with the set valves. The molten material travels through the open valve gates and into the mold cavity 24 to form the part. The valve gates, pneumatic or hydrantic, are preferably solenoid actuated.

As shown in this embodiment, where the valve gates open and close based solely on time, at time 0.00 valve gate numbers one and five are opened allowing molten plastic to flow therethrough. As the screw continues to move, at a point just after 0.00 seconds, approximately 0.40 seconds, valve gate number six opens. After 3.6 seconds of total screw travel time, valve gate number one closes. Valve gate number one was thus open for 3.6 seconds. Valve gate number two opens after about 4.20 seconds of screw travel time, while valve gate number four opens after 5.0 seconds of screw travel time and closes at the same time that valve gate number seven opens after about 5.4 seconds of screw travel. Valve gate number 4 was thus open for 0.40 seconds.

After 5.8 seconds, valve gate number five closes and after 6.0 seconds of screw travel time, valve gate number six closes, preventing any further flow of molten material therethrough. Valve gate number five was open for 5.8 seconds and valve gate number six was open for 5.6 seconds. Valve gate number seven closes after 10.0 seconds of screw travel time and was open for 4.6 seconds, while valve gate number two closes after 8.2 seconds and was open for 4.20 seconds. After 8.0 seconds of screw travel time, valve gate number three opens and then closes one second later after 9.0 seconds of screw travel time. After 14.6 seconds, valve gate number eight closes after being open for 7.40 seconds and the mold fill sequence is complete. It should be understood that all of these times are approximations. As discussed above, because of variances with the screw 16 as well as the valve gate bushings 30, opening and closing the valve gates 31 based on time can result in an unevenness in the mold filling process and usually results in a reject because of too much or too little molten material being injected into the mold. Over the course of molding many parts, this is a significant expense.

As shown in FIG. 1, the injection molding machine of the preferred embodiment, also includes a linear transducer 34. The linear transducer 34 or linear potentiometer is in communication with the computer 32 to monitor the position of the reciprocating screw 16. The linear transducer 34 is comprised of an encoder that is attached to the machine 10 and produces an output to indicate the position of the screw 16.

Thus, in accordance with the preferred embodiment of the present invention, the opening and closing of the valve gates 31 can be also controlled by the computer 32 based solely on the position of the reciprocating screw 16.

Alternatively, a pressure transducer (not shown) can be included to monitor the pressure in the mold cavity 24 by being placed directly in the mold cavity 24 or at the entrance to the valve gate bushings 30 to measure the pressure created by the molten material in the cavity 24. The pressure transducer sends an electrical output signal to the computer 32 to control the system in accordance with the input parameters.

Figure 5:
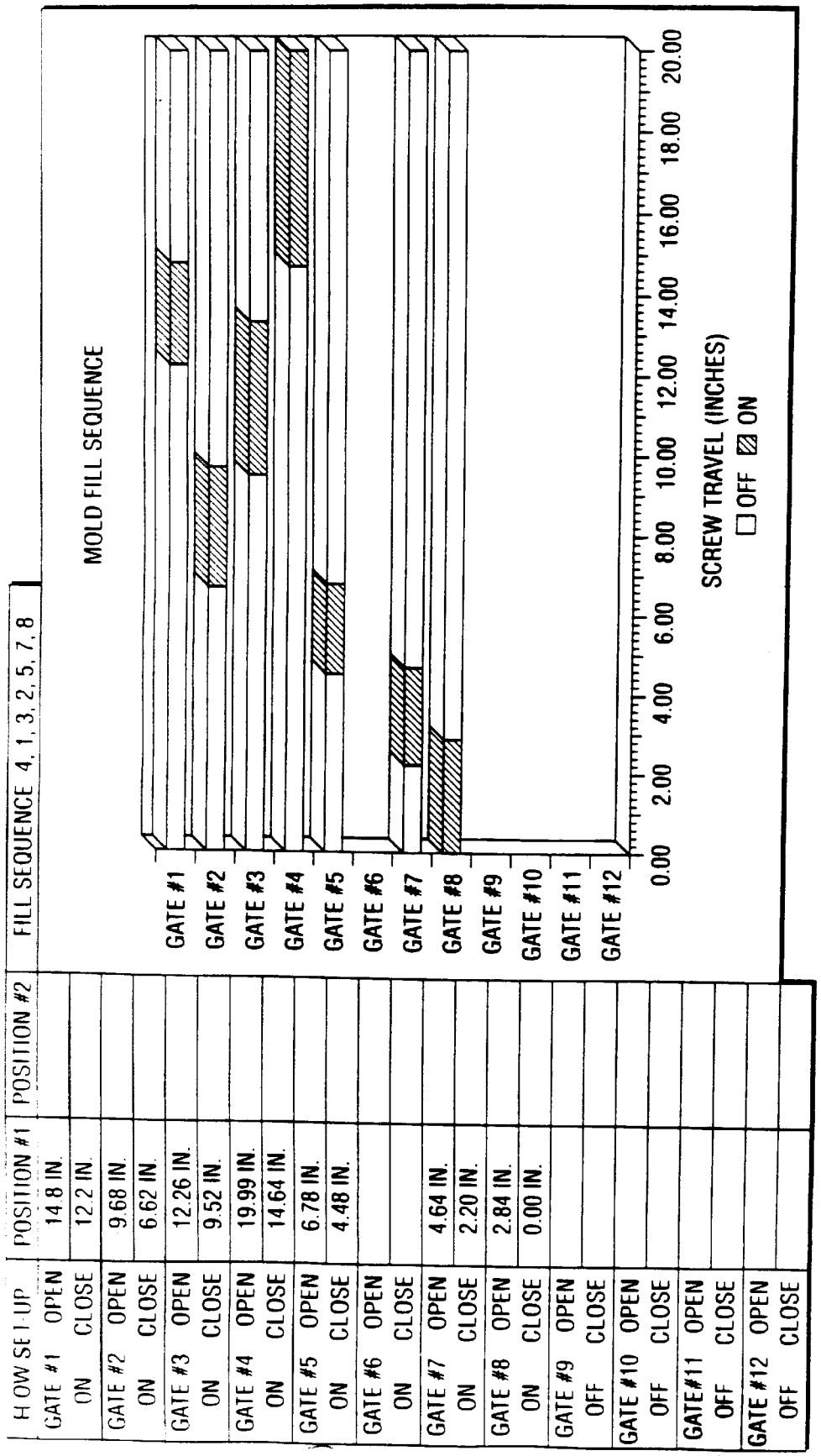
FIG. 5 is a bar chart illustrating a mold fill sequence used to control the opening and closing of a plurality of valve gates based on linear screw position to mold a particular part.

FIG. 5 illustrates a mold fill sequence similar to that shown in FIG. 4. However, the mold fill sequence of FIG. 5 is based on the linear screw position, as indicated by the linear transducer 34, instead of by time. As shown in FIG. 5, prior to initiation of the injection molding process, the computer 32 is programmed such that valve gate numbers one through five and seven and eight are turned "on" as they will be utilized in the process while valve gate numbers six and nine through twelve are turned "off" as they are not used in the process for this particular part.

Once the computer 32 receives the signal that the mold halves 20, 22 are closed and the system is ready, the injection molding process is initiated. Based on the length of screw travel, valve gate numbers one through five and seven and eight open and close in response to certain positions of the reciprocating screw 16 as detected by the linear transducer 34.

FIG. 5 is a graph illustrating the valve gates 31 on the vertical axis and the screw travel in inches on the horizontal axis. After initiation of the injection molded process, the screw moves from its starting position (20.0 inches). Immediately after initiation of the process at 19.99 inches, valve gate number four opens. Valve gate number four closes at 14.64 inches (5.35 in. of screw travel). At 14.8 inches valve gate number one opens, and at 12.26 inches valve gate number three opens. Valve gate number one closes at 12.2 inches (2.6 in. of screw travel). Valve gate number two opens at 9.68 inches while valve gate number three closes at 9.52 inches (2.74 in. of screw travel). Valve gate number five opens at 6.78 inches while valve gate number two closes at 6.62 inches (3.06 in. of screw travel). Valve gate number seven opens at 4.64 inches, valve gate number five closes at 4.48 inches (2.30 in. of travel). Valve gate number eight opens at 2.84 inches, and valve gate number seven closes at 2.2 inches (2.44 in. of screw travel). Valve gate number eight closes at 0.0 inches (2.84 in. of screw travel). Opening and closing of the valves by linear position of the reciprocating screw 16 is far more accurate than opening and closing them based on time. Setup time can also be decreased.

Figure 6:
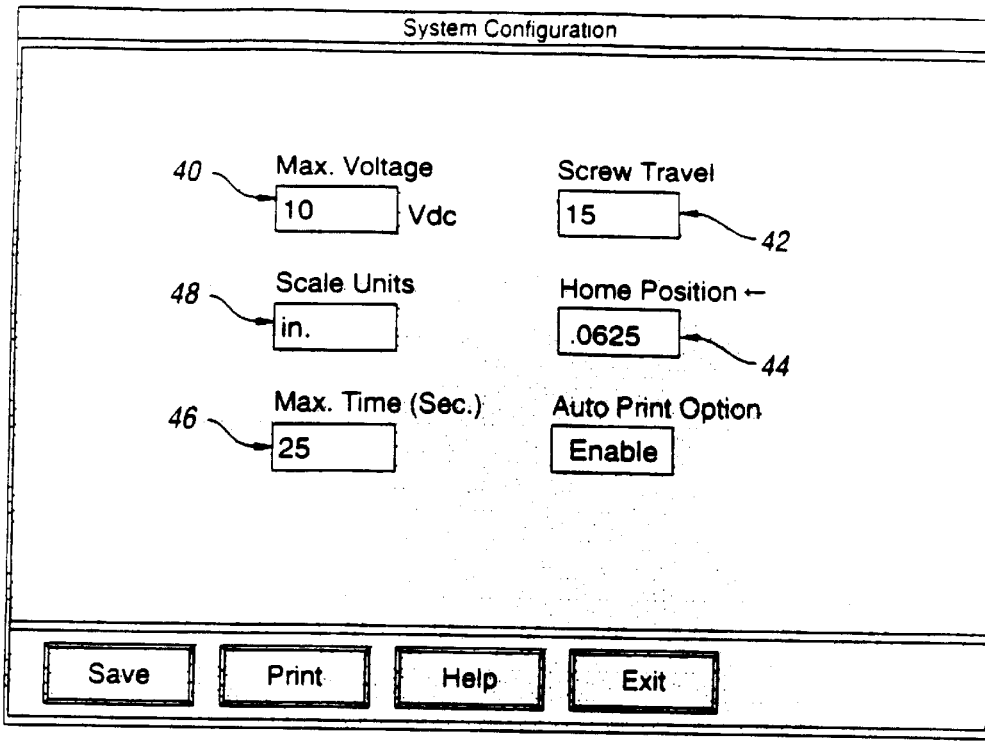
FIG. 6 is a diagram illustrating the system configuration which defines the input of devices or parameters to control the valve gates in accordance with the present invention.

Turning now to FIGS. 6 through 10 which illustrate a preferred embodiment of the computer controlled sequencing of the valve gate bushings 30 in accordance with the present invention. FIG. 6 illustrates the configuration of the system which is set up prior to commencement of the injection molding process. During set-up, the user can select whether the mold fill sequence is to be based on time, position of the screw 16, and/or pressure or a combination thereof.

While only eight gates are shown being used in FIGS. 4 and 5, it is thus obvious that more or less valve gate bushings 30 may be employed and that the valve gates 31 may open or close at different times and/or positions. Additionally, the various parameters can also be changed depending upon the part to be molded. FIG. 6 illustrates the preferred parameters for one embodiment of the present invention. The data in FIGS. 6 through 10 is all preferably input into the computer 32 via a touch screen. Alternatively, a mouse or a keyboard, can be used to input information. However, other known apparatus for data entry may be used. Further, if the operator intends to mold a part based on previously set up parameters, such parameters can be pulled up from a previously saved file and used without any further set up and without the need to re-input the parameters as the parameters from the file will be used. The system can also be used to convert a file with stored parameters based on time to parameters based on screw travel. This is an advantage for a machine that previously ran based on time, but is being equipped or retrofitted to run based on screw position. The preferred system also allows for conversion of the parameters from screw position to time.

The maximum screw travel distance is entered in box 42 and is shown as 15 inches. The allowable set for the home position or starting point of the screw is 0.0625 inches, shown in box 44. The maximum cycle time is 25 seconds as shown in box 46. Further, the system can be toggled to operate in metric by entering millimeters instead of inches into box 48. These parameters can all be varied or adjusted depending upon the injection molding apparatus. The box 40 indicates the output of the transducer which in the preferred embodiment is 10 V, but this may also vary.

Figure 7:
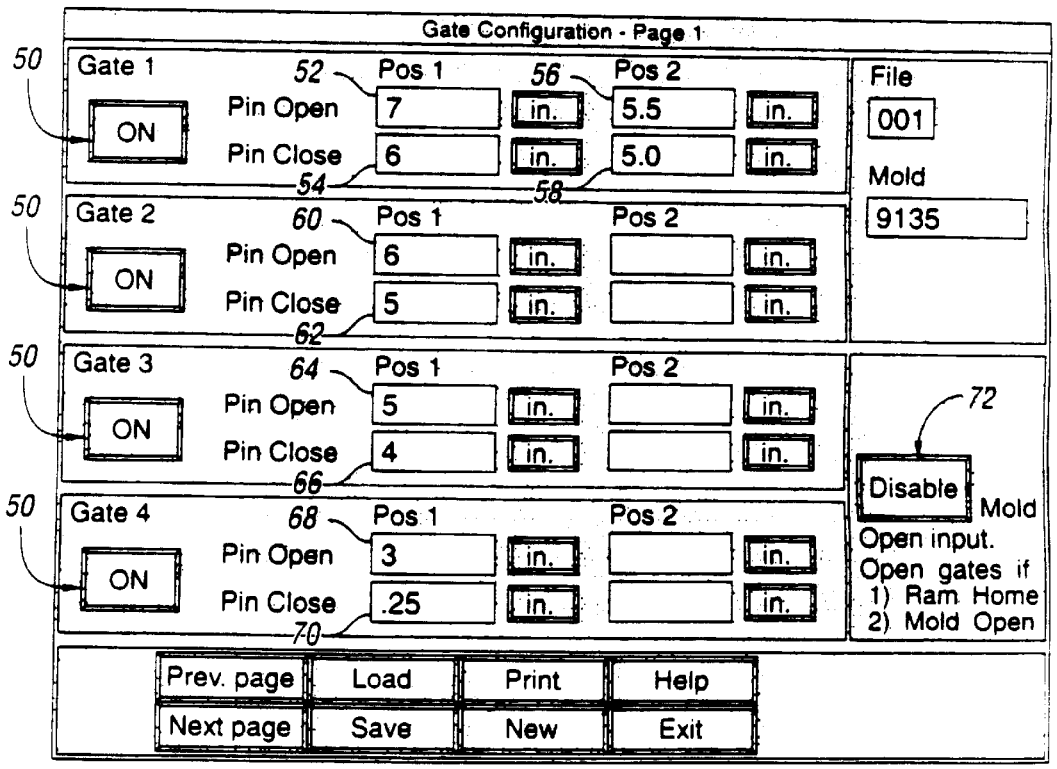
FIG. 7 is a diagram illustrating the valve gate configuration to be entered for each specific valve gate in accordance with the present invention.

FIG. 7 illustrates the gate configuration for the valve gate bushing numbers one through four to be used in connection with molding a part in accordance with the parameters input into the computer 32. However, the system may be upgraded to forty or more valve gates as necessary. Each valve gate bushing 30 has a button 50 that allows the operator to toggle it "on" or "off". As shown, valve gate bushing numbers one through four are all in the "on" position. Each valve gate 31 has at least two columns associated therewith indicating the capability for each valve gate to open and close more than once during any given injection molding process. For example, valve gate one opens and closes twice in this one process.

Valve gate number one is opened the first time at 7 inches as shown in box 52 and closes at 6 inches (box 54). Valve gate number one opens a second time at 5.5 inches as shown in box 56 and closes at 5.0 inches as shown in box 58. Valve gate number two opens at 6 inches (box 60) and closes at 5 inches (box 62), while valve gate number three opens at 5 inches (box 64) and closes at 4 inches (box 66), and valve gate number four opens at 3 inches (box 68) and closes at 0.25 inches (box 70). The positions in the various boxes can be modified as needed by the operator to change the opening and closing positions of each of the valve gates. The positions of the remaining vale gates, if necessary, are not specifically shown in this figure and will vary depending upon the part to be molded. In the preferred embodiment, the screw positions are measured based on a predetermined screw starting point and as the screw travels it moves toward a zero ending position. A disable button 72 is also included to open all gates while the mold is open. This process warms the pin and is preferred in some molding applications such as for heat sensitive materials.

Figure 8:
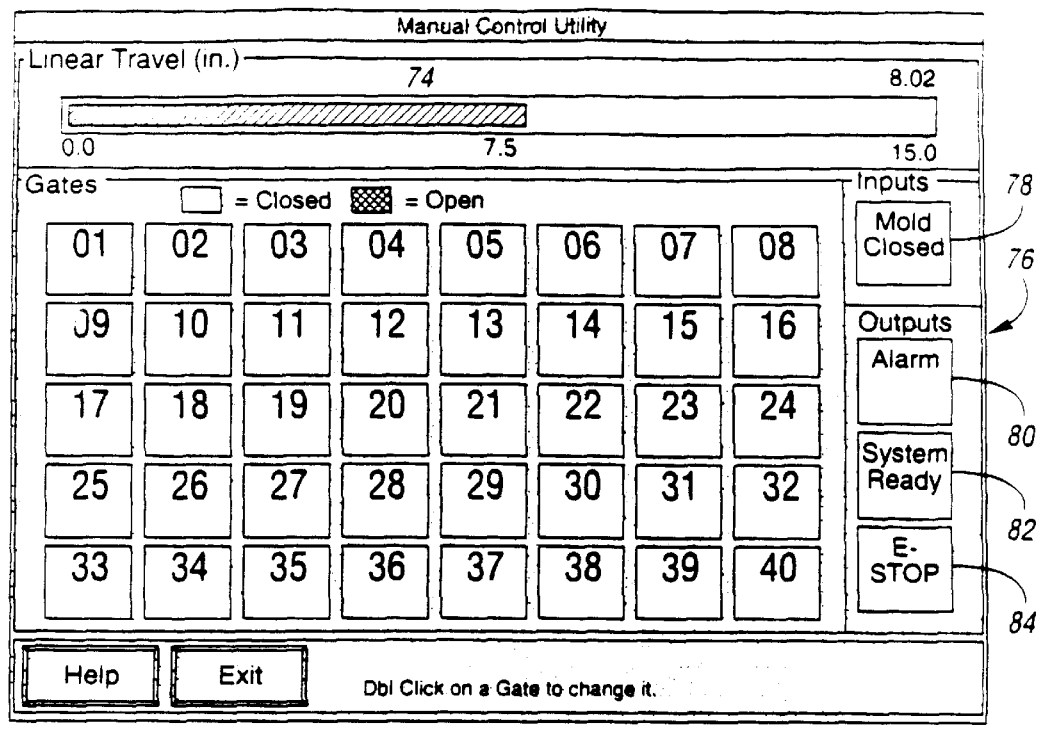
FIG. 8 is a diagram illustrating the system status in manual control allowing opening and closing of the individual gates on setup prior to commencement of the molding process.

FIG. 8 illustrates a manual operator screen that allows an operator to open gates manually while watching the linear travel of the screw. This screen, like the others, indicates the position of the mold halves 20, 22. The liner travel of the screw is represented by the bar 74, which is based on the information received from the linear transducer. A status column 76 is also present indicating various system inputs and outputs. The system input is a mold closed indicator 78 that tells the computer 32 that the mold is closed. System outputs include an alarm light 80, a system ready light 82, and an emergency stop 84 which can all be tested by operator activation.

Figure 9:
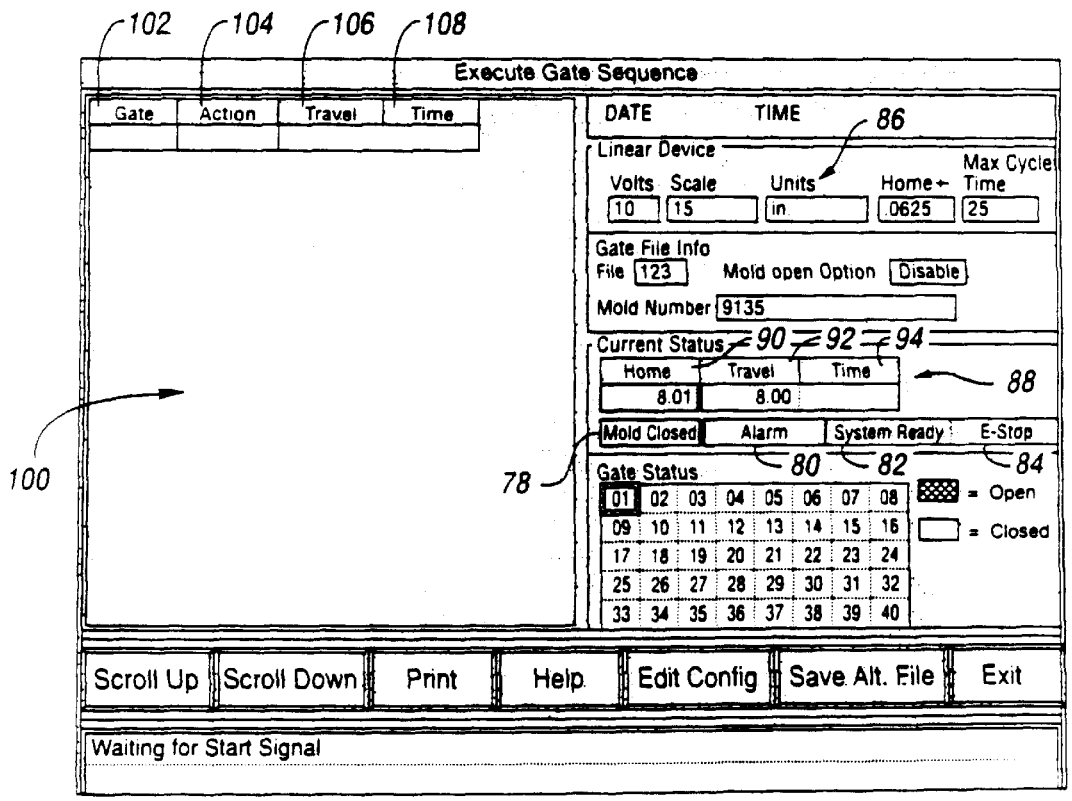
FIG. 9 is a diagram illustrating the system status prior to operation of the molding process in accordance with the present invention.

FIGS. 9 and 10 illustrate the sequence of opening and closing the valve gates. This screen is displayed throughout the molding cycle and it continuously changes so that it can be monitored by an operator. The linear device data is shown on bar 86. This data includes the maximum voltage output of the transducer, the maximum travel distance of the screw, the units (inches or millimeters) the system is operating in, the allowable offset from home, and the maximum cycle time. The status bar 88 illustrates the current system status. The home position or starting point of the screw is shown at 90, the present distance of travel for the screw is shown at 92, and the time elapsed is shown at 94. The status bar 88 also indicates the status of the system inputs (mold closed) 78 and system outputs (alarm) 80, (system ready) 82, and (emergency stop) 84.

The valve gate status is shown in the box 100 on the left-hand portion of the screen which indicates the valve gate number 102, the action of that valve gate 104 (whether it opened or closed), the travel of the screw at which the action took place 106, and the time at which the action took place 108. As the screw position changes, the status of these valve gates change and the information appears on the box as the screw travels from its home position throughout its set length of travel. FIG. 10 illustrates the status of the system after a full cycle and thus all the valve gates are closed. There are a variety of intermediate screens that appear throughout a single process, as can be understood by those of skill in the art. After the mold closes, the box 100 is cleared, the screw then returns to its home position, and the process is again ready for initiation to mold another part.

FIG. 11 illustrates a verify home position screen. This allows the operation to ensure that the reciprocating screw 16 is in the home position prior to initiating the injection molding cycle. If the screw is not at the home position or within its allowable offset, a reject part will be formed as either too much or too little material will be delivered to the mold. If the screw is in the proper position, the operator will click the button 120 to continue with the set-up. The position of this reciprocating screw is show in box 130 so its position may be viewed.

Each of the valve gate bushings 30 may include a sensor associated therewith. The sensor provides feedback to the computer 32 as to any action taken by that valve gate, i.e, whether the respective valve gate opened as required or not. If the valve gate did not open as required, the pressure could build up and damage the mold. The alarm will be activated if one or more of the valve gates did not open as required or otherwise failed. This provides constant feedback that the system is operating as required.

In operation, the computer 32 receives a signal from an encoder, a linear potentiometer, or a linear motion transducer. The computer can also receive a signal from a pressure transducer, a timer, and a temperature control input located inside the mold cavity that monitors the surface temperature of the mold. Additionally, feedback can be provided to the computer 32 to confirm that water is on and to ensure that an overheat condition is not achieved in the mold. The computer 32 also receives signals from the injection molding machine that indicates whether the mold is in the open or closed position.

As the computer 32 is in communication with, but separate and distinct from the machine 10, the computer 32 and inputs such as keyboard, screen, and mouse can be located at a position distant or remote from the machine. Thus, the operator can be located at a remote position and can control the machine processes via wires, fiber optics, ISDN lines, or even by modem. Additionally, files containing setup information and parameters can be downloaded from one computer to another to further decrease the set up time.

Figures 12, 13:
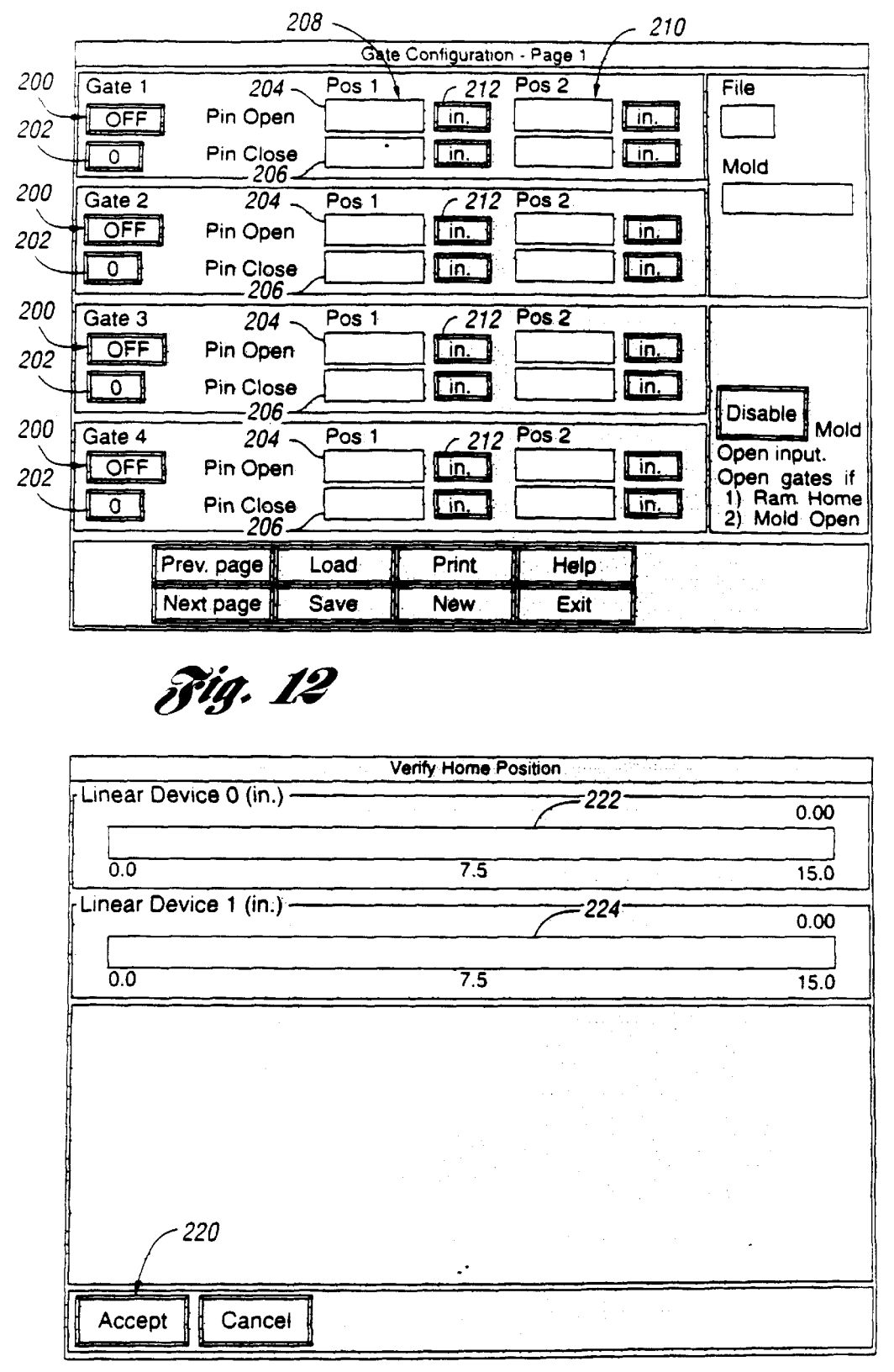
Figure 14:
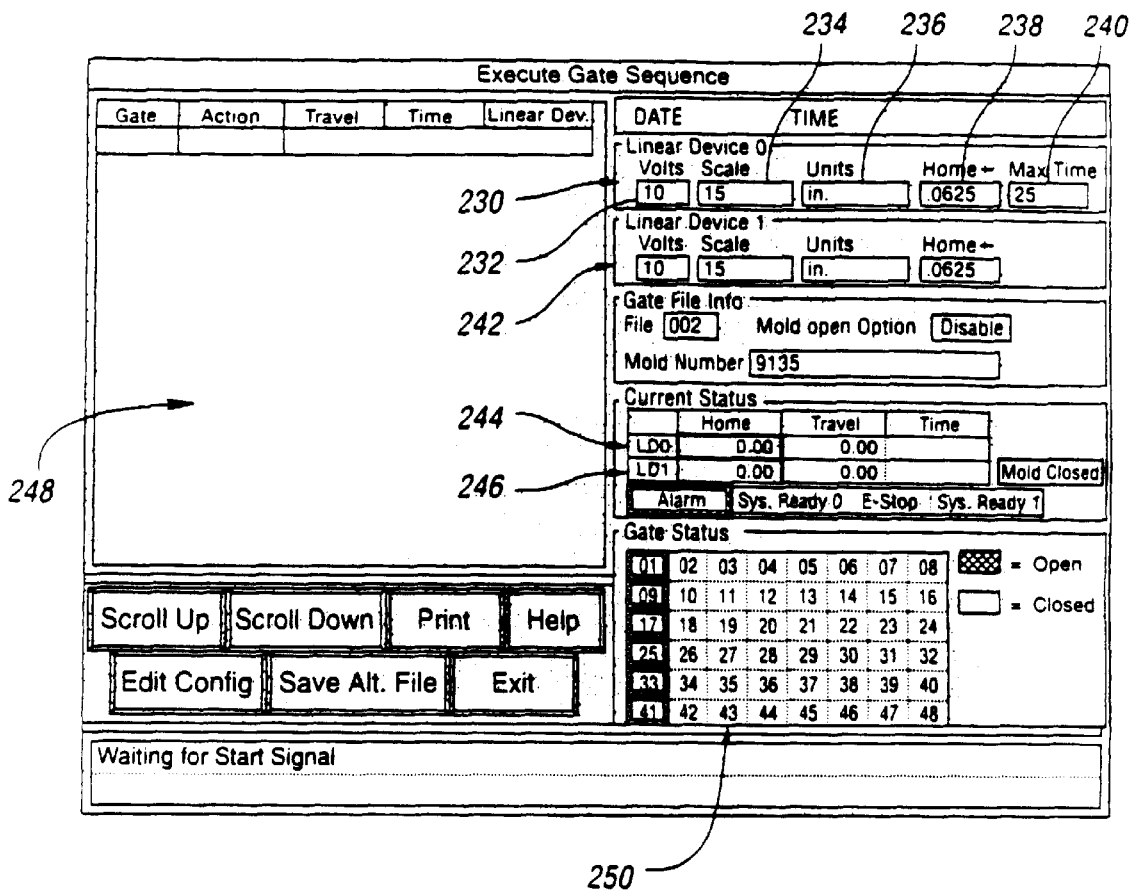
FIG. 14 is a diagram illustrating the system status prior to operation of the molding process for the dual reciprocating screw system embodiment of the present invention.

An alternative embodiment of the present invention is shown in FIGS. 12 through 14. In this embodiment, two screws are used to perform the injection molding of a part or parts and two linear potentiometers or transducers are included on the machine. The first linear potentiometer position monitors the first screw and the second monitors the second screw. The use of two screws is useful in a variety of operations. In one embodiment, wherein 12 valve gates are needed to form a part, the first reciprocating screw can be used to supply molten material to valve gate numbers one through five. The second reciprocating screw can be used to supply molten material to valve gates six through twelve.

In another embodiment, the reciprocating screws can each be used to mold a separate part. For example, the screws can be set up to mold two mating parts at the same time. For example, one screw can be used to provide molten material to a manifold and a plurality of valve gates and to a mold cavity to mold a cup while the second screw can be used to provide molten material to a separate manifold and a separate plurality of valve gates and then to a separate mold cavity to form a mating top for the cup. In yet another embodiment, the reciprocating screws can be used to mold a part where one reciprocating screw provides molten material to form a skin for a part while the second reciprocating screw provides molten material to form a core for the same part. It should be understood that the screws operate as discussed above. Further, it is obvious that more than two screws and thus more than two linear transducers can be used. Further, one screw can operate to open and close the gates based on screw positions, while the second screw can be used to open and close the gates based on time.

FIGS. 12 through 14 illustrate one embodiment of how the computer and system can be set up to operate two reciprocating screws to mold a part or parts. FIG. 12 illustrates the gate configuration for a dual linear device system. This figure illustrates a screen for configuring valve gate numbers one through four. However, as discussed above, 40 or more valve gates may be utilized depending upon the part to be molded.

Valve gate numbers 1 through 4 are all illustrated as being "off", but by activation of the buttons 200, each of the valve gates can be toggled to be "on" for operation in the next injection molding cycle. A linear device button 202 is included to tell the computer 32 to which reciprocating screw the valve gate will be connected. The button 202 can be toggled from a "0" for the first reciprocating screw to a "1" for the second reciprocating screw. Therefore, if the gate button 200 is on, the computer 32 will check the status of button 202 to see which screw is controlling the valve gate.

The screw position at which the valve gates are to open is shown at 204, while the position at which the valve gates are to close is shown at 206. As with the single linear device system, a pair of columns 208, 210 are present allowing each gate to open more than once during a given run. The units of measurement is shown in inches, but can be toggled by button 212 to be measured in millimeters.

FIG. 13 illustrates the verify home position screen. This allows the operator to ensure that both reciprocating screws are in the home position prior to initiating the molding cycle. If the screws are in the proper positions, the operator will click button 220 to continue with set up. The position of the reciprocating screws is shown in boxes 222 and 224 respectively so the operator may view their respective positions.

FIG. 14 illustrates the execute gate sequence for a dual linear system. The bar 230 illustrates the parameters of the first reciprocating screw. Specifically, the output of transducer (232), the maximum travel of the screw (234), the units of measurement (236), the offset from the home position (238), and the maximum cycle time (240). The bar 242 illustrates the same parameters as shown on the bar 230, but for the second reciprocating screw.

The current status is shown for the first reciprocating screw on bar 244 while the current status of the second reciprocating screw is shown on bar 246. The display 248 illustrates the opening and closing of the gates as they occur based on screw travel or time while the status of the gates at any given time is shown at 250.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come winded to be embraced herein.

What is claimed is:

1. A method for injection molding a plastic part, including an injection molding machine, having a barrel filled with a molten material and a reciprocating screw therein, the barrel in fluid communication with a pair of mold halves, the method comprising:

closing the pair of mold halves to form at least one mold cavity in the shape of the part or parts to be molded;

positioning a plurality of normally closed valve gates across the surface of one of the pair of mold halves;

monitoring the position of the reciprocating screw as it moves through a length of travel from a home position to an end position;

programming a computer associated with the machine to open and close said plurality of valve gates during a single length of travel of the reciprocating screw, said plurality of valve gates in communication with said computer to each open and close based solely on the position of the screw as it moves through said length of travel;

positioning the screw in said home position based on the part or parts to be molded during a given molding cycle; and moving the reciprocating screw from said home position to begin said given molding cycle, said movement causing said computer to open at least one of said plurality of valve gates based on the linear position of the screw, allowing molten material to flow into said at least one mold cavity through said at least one open valve gates; and continuing to move the reciprocating screw toward said end position, said movement causing said computer to close said at least one open valve gate based on the linear position of the screw preventing molten material from flowing therethrough, said continued movement causing said computer to open another of said plurality of valve gates based on the linear positions of the screw allows molten material to flow through said another open valve gate.

2. A method for injection molding a plastic part as recited in claim 1, wherein each of said plurality of valve gates are opened simultaneously.

3. A method for injection molding a plastic part as recited in claim 2, wherein each of said plurality of valve gates are closed at different screw positions.

4. A method for injection molding a plastic part as recited in claim 1, wherein each of said plurality of valve gates are opened at different screw positions.

5. A method for injection molding a plastic part as recited in claim 1, further comprising:

opening and closing at least one of said plurality of valve gates more than once during said given molding cycle.

* * * * *